Sept. 21, 1954  A. O. HELLKVIST  2,689,588
MEANS FOR AUTOMATIC MANUFACTURE OF CLOTHESPINS
Filed July 19, 1949  6 Sheets-Sheet 1
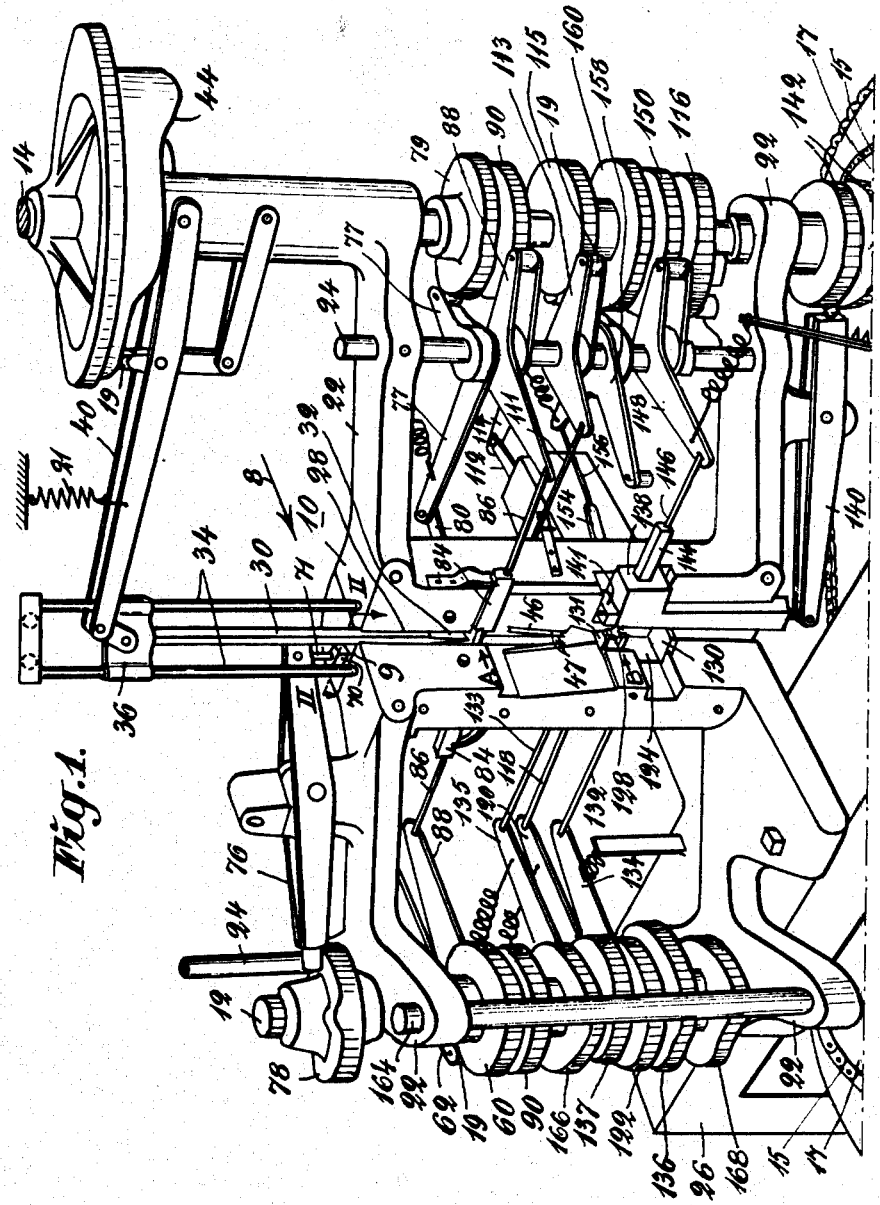

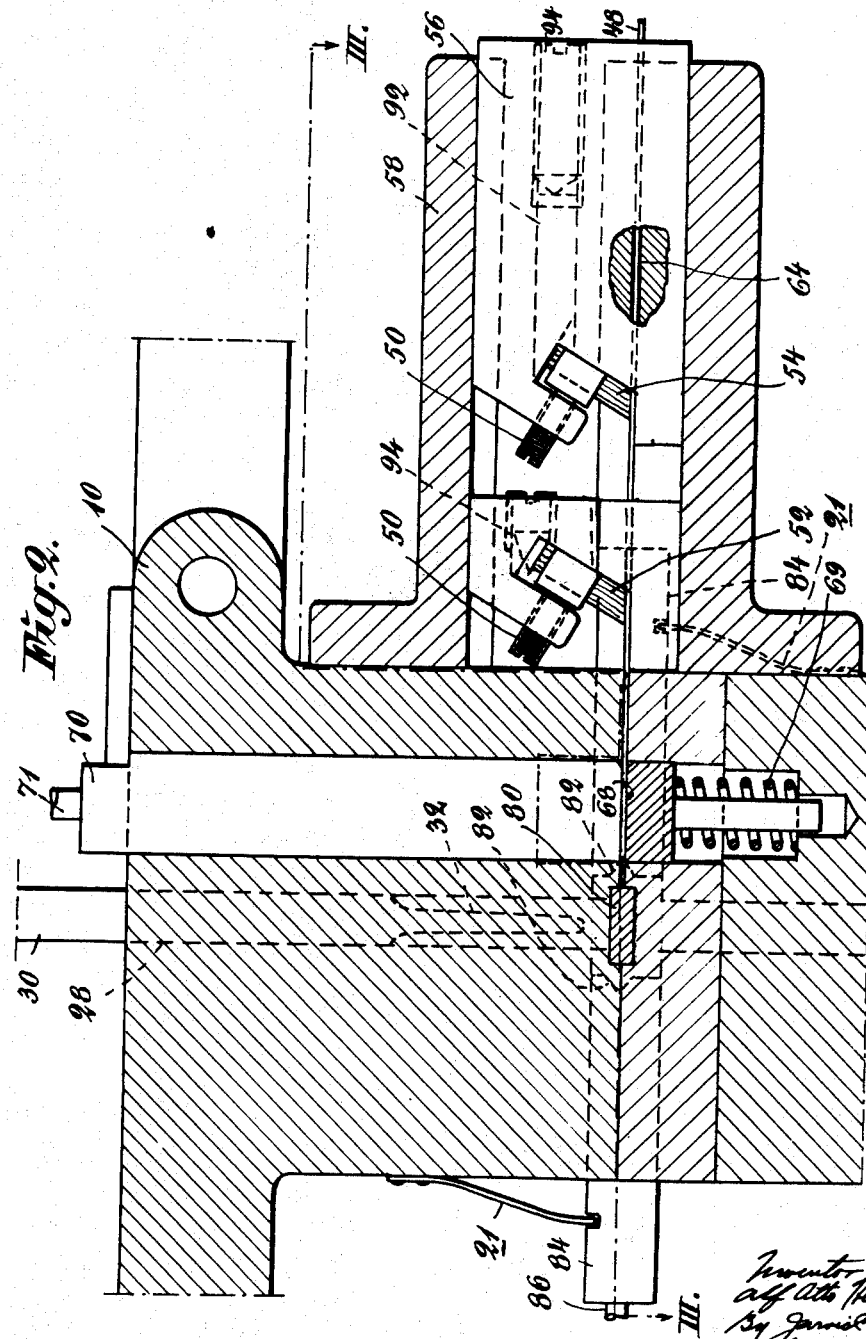

Sept. 21, 1954　　　A. O. HELLKVIST　　　2,689,588
MEANS FOR AUTOMATIC MANUFACTURE OF CLOTHESPINS
Filed July 19, 1949　　　　　　　　　　　　　6 Sheets-Sheet 3
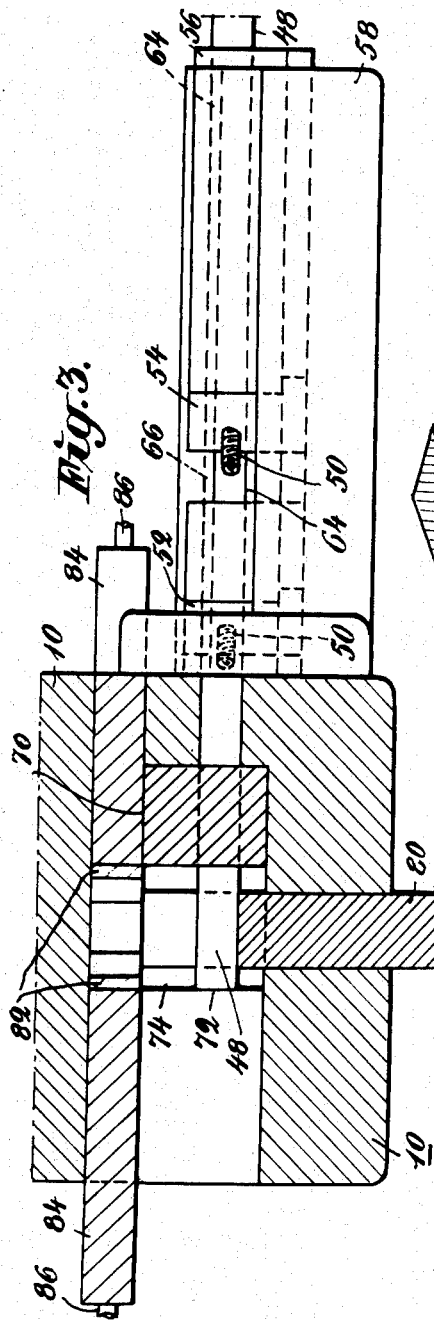
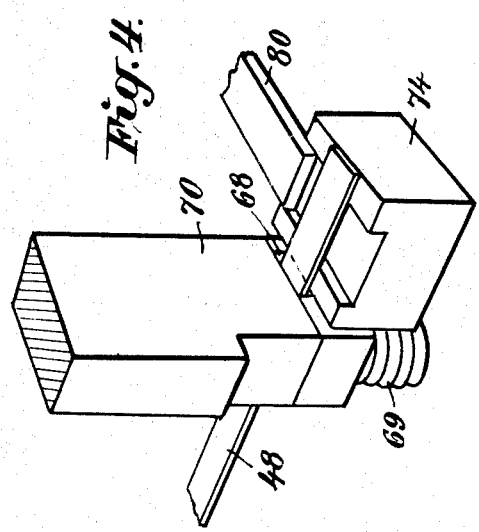

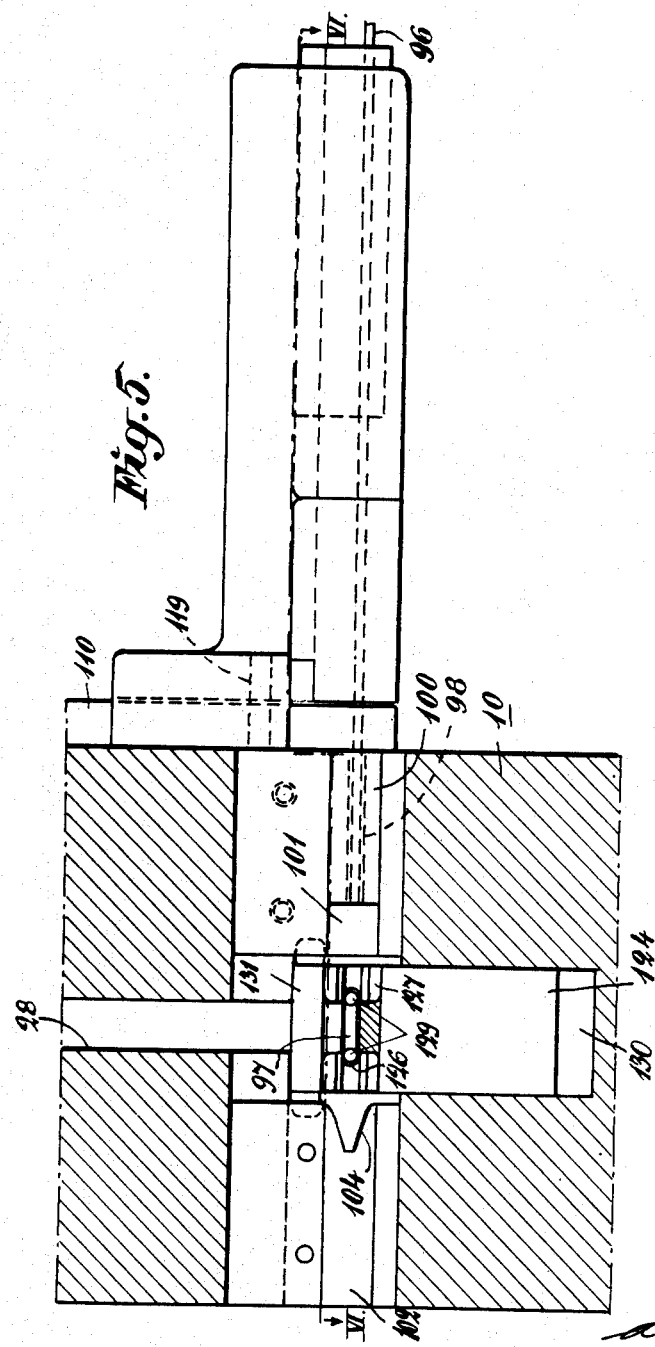

Sept. 21, 1954  A. O. HELLKVIST  2,689,588
MEANS FOR AUTOMATIC MANUFACTURE OF CLOTHESPINS
Filed July 19, 1949  6 Sheets-Sheet 5
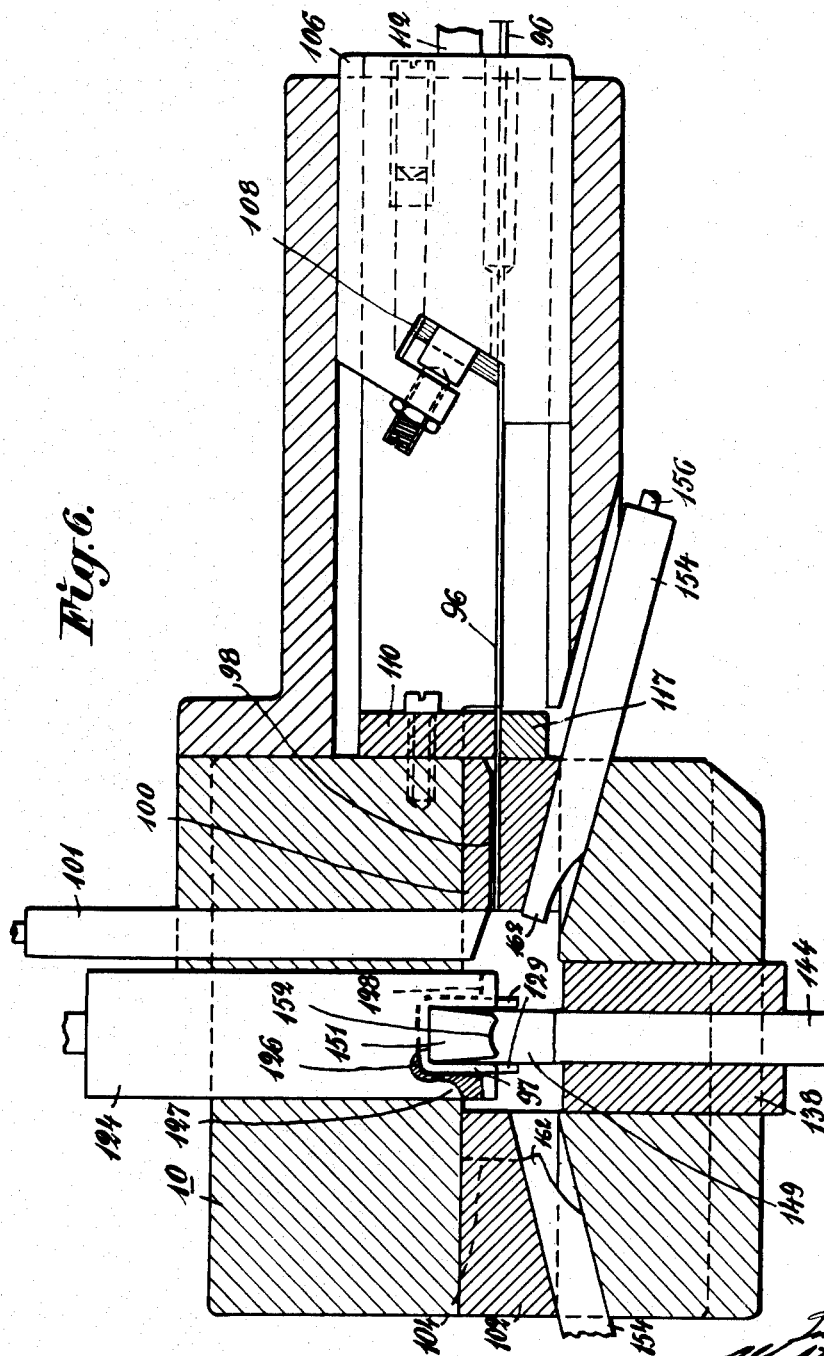

UNITED STATES PATENT OFFICE 2,689,588

MEANS FOR AUTOMATIC MANUFACTURE OF CLOTHESPINS

Alf Otto Hellkvist, Enskede, Stockholm, Sweden, assignor of thirty per cent to Nils Ericsson, Vagnharad, and thirty per cent to Axel William Hauffman, Stockholm, Sweden Application July 19, 1949, Serial No. 105,608

11 Claims. (Cl. 144—9)

My invention relates to clothes pins comprising two jaws preferably made of wood, having a spring member mounted between said jaws and a loop or hoop member encircling said jaws and more particularly to means for manufacturing such clothes pins automatically.

The primary object of my invention is to provide means for automatic manufacture wherein the parts to be assembled are under positive control throughout their formation and movement to their positions of assembly so as to locate them in their exact positions without risk of deformation.

Further objects and advantages of my invention will be apparent from the following description of a preferred embodiment considered in connection with the accompanying drawings which form part of this specification and of which:

Fig. 1 is a perspective view of a machine constructed in accordance with the invention;

Fig. 2 is a vertical section through a portion of the machine on the line II—II of Fig. 1 and viewed in the direction of the arrow 8;

Fig. 3 is a horizontal section along the line III—III of Fig. 2 on the level of a station designated by A in Fig. 1, where a portion of the spring is cut off from a metal strip and pushed forward into its position of insertion;

Fig. 4 is a somewhat diagrammatic perspective view of members operating at the station A;

Fig. 5 is a vertical section on the line V—V of Fig. 7, taken in a plane extending at right angles to that of Fig. 2, and illustrating members operating at a station B where the final assembly of the clothes pin is performed;

Fig. 6 is a horizontal section through the same station on the line VI—VI of Figs. 5 and 7;

Fig. 7 illustrating on an enlarged scale elements of Fig. 1 viewed in the same direction as in Fig. 1.

Figure 7:
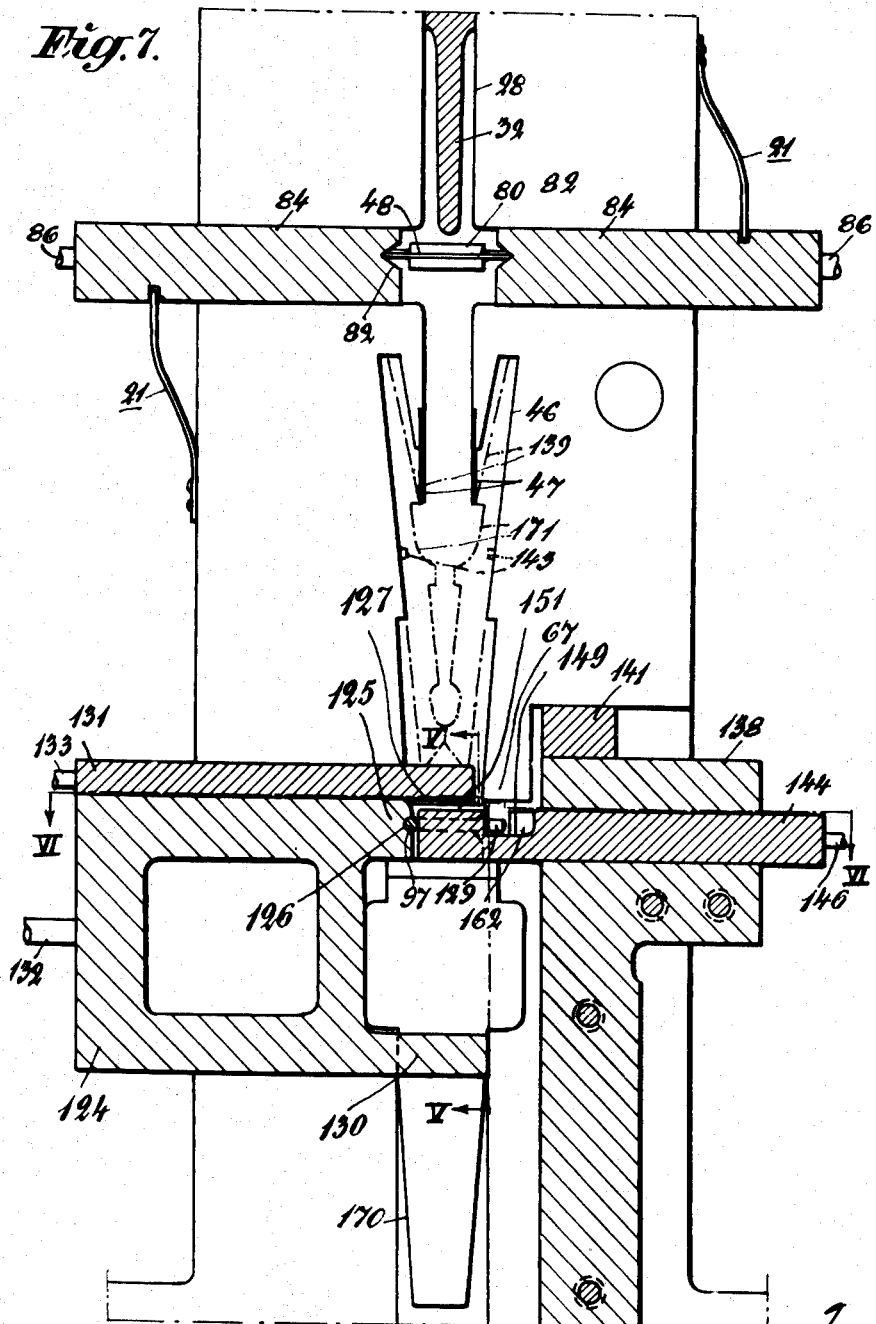
Fig. 7 is a vertical section through both stations mentioned above in a plane coinciding with the line 9 of Fig. 1.

Referring to the drawings, 10 designates a pillar or frame structure suitably made of cast-iron forming a support on which the operations according to the invention for the assembly of a clothes pin are carried out. Laterally of the support extend a number of rotatable vertical shafts, in the embodiment illustrated two, designated by 12 and 14, respectively, on which are rigidly mounted a plurality of cam discs. During rotation of said shafts, said cams through rock levers and rod transmissions actuate members slidable within pillar 10 and adapted to perform the various operations.

Shafts 12 and 14 are driven by a motor (not shown) and are driven by means of a chain 15 running over gear wheels 17 rigidly mounted on said shafts to rotate with the same rotational speed. The shafts 12 and 14 are rotatably mounted in brackets 22 extending laterally from the support 10. These brackets carry further vertical shafts 24, on which the rock levers are pivotally mounted. The pillar 10 with the brackets 22 is rigidly mounted on a base plate 26.

The pillar 10 has a vertically extending elongated central passage or bore 28 which in the embodiment illustrated is of square cross-section. A rod 30 of a form corresponding to that of the bore is slidably guided within the bore and its lower end portion 32 is of downwardly tapering shape. The rod 30 is guided externally of said bore by two guide bars 34 on which is slidably mounted a guide shoe 36 rigidly connected with said rod and caused to undergo a vertical reciprocating movement by a lever 40 in turn actuated by a cam 44 through a roller 19 and suitable linkage. Lever 40 is acted on by a return spring 21. Similar rollers and return springs are provided also in connection with other levers of the machine hereinafter described, but such rollers and springs will not be referred to particularly when describing said other levers. Adjacent to the bore 28 are two oppositely disposed recesses 46 having a shape substantially conforming to that of the jaws to be assembled to form the clothes pin. At the points of transition from the bore to the recesses two resilient tongues 47 project downwardly.

The cycle of operations disregarding the chronological order, may be divided up into the following four main phases:

1. The jaws of the pin are introduced in pairs into the recesses 46.

2. A strip of spring steel is fed into the machine, a predetermined length cut off therefrom and the piece cut off is conveyed to the position of assembly.

3. A steel wire is fed into the machine, cut off to a predetermined length and the piece cut off is formed into the shape of a hoop member which is conveyed to the position of assembly.

4. The assembly operation proper.

The first-mentioned phase is performed in a V-shaped groove (not shown) wherein pieces of wood having a particular profile formed by a cutter are advanced and immediately prior to their arrival at the pillar 10 are cut off into jaws of suitable breadth and are then inserted into the recesses 46.

The second-mentioned phase is performed at a station A (Fig. 1) by means of a mechanism most clearly seen in Figs. 2, 3, 4 and 7. A steel strip 48 is fed into the machine along a plane extending perpendicularly to the axis of the bore 28 by means of a feeding device comprising two leaf spring units or detents 52, 54, each unit being held in place by means of screws 50. The leaf spring units are set at an inclination with respect to the direction of feed and the unit 52 is stationary whereas the unit 54 is reciprocatingly movable with a slide block 56 carrying said unit 54. Slide block 56 is guided within a casing 58 and actuated by a cam 60 through a rocker 62 and a transmission rod (not shown).

The strip 48 is fed forward in a groove 64 provided in the slide block 56 and during the free advancing movement its portion between the leaf spring units 52, 54 is guided by one of its edges engaging a groove 66 in the casing 58 (Fig. 3). When the slide block 56 moves towards the pillar 10, the leaf springs in the unit 54 are loaded due to their slope relatively to the steel strip and advance said strip past the spring unit 52, the leaf springs of which, during this advancing movement of the strip, have a relatively feeble grip on said strip. As soon as the spring unit 54 is forced by the returning slide block 56 to move in the opposite direction, the spring unit 52 grips the strip while the springs of the unit 54 slip along the strip.

The pressure of the spring units on the steel strip may be adjusted by means of pins 92 (Fig. 2) abutting at an angle against the upper ends of the leaf-springs and held pressed thereagainst by adjusting screws 94. In the embodiment illustrated in the drawings the screw regulating the spring unit 52 is shaped with an inclined front face directly bearing on the spring unit and of conical form.

During its forward movement the strip passes through an aperture 68 of a punch member or shear 70 biased upwardly by a spring member 69 and just as the leaf spring unit 54 has finished its forward movement, the front end of the strip abuts a stop 72 (Fig. 3). The strip now extends with a portion of predetermined length over a die 74. Along the outer edge of said die extending at right angles to the direction of movement of the strip, the punch member 70 which is reciprocatingly movable under the influence of a rod 71, a rock lever 76 and a cam 78 actuating said rock lever, cuts off the piece of the strip located on the die. This piece of the strip is then advanced by a feed member 80 actuated by a rock lever 77 and a cam 79 to a position right across the bore 28.

In this position each end of the piece enters a notch 82 in two oppositely disposed bar-shaped gripping members 84 simultaneously movable in the horizontal direction into and out of the bore 28. The reciprocating movement of said gripping members is effected by rods 86 actuated by cams 90 through rockers 88.

The third-mentioned phase is performed at a station B (Fig. 1) by means of a device most clearly shown in Figs. 5, 6 and 7. An iron wire 96 is introduced into the bore 28 through an aperture 98 in a block 100. Along the edge of this block facing the bore a reciprocatable punch or cutter member 101 cuts off the wire at the moment it has been advanced to abut a stop 102 disposed opposite to the block 100 and provided with a V-shaped recess 104 (Fig. 5). The wire is fed by means of a leaf spring unit 108 secured to a reciprocating slide block 106 in the same manner as is the case with the steel strip feed in the preceding phase. However, the stationary spring unit 52 has been replaced by a gripping member 110 operating as a pair of pliers and retaining the wire when the spring unit 108 moves out of and away from the bore 28. The movement of the spring unit is effected by a rod transmission 112 actuated through a rocker 114 by a cam 116 and that of the movable part 117 of the gripping member by a rod 111 actuated through a rocker 113 by a cam 115.

Within the pillar 10 a further block 124 is reciprocatable in a direction perpendicular to the direction of movement of the wire. Block 124 viewed from the left in Fig. 5 has the shape as shown in Fig. 7 of a horizontally positioned U, the upper jaw 125 of which has its end formed as a fork 127. The interior faces of the fork limbs or tines of upper jaw 125 are provided with a horizontally extending indentation 126 passing through the free ends of the fork and forming recesses 128 adapted to engage the introduced wire portion 96. The lower jaw of the U-shaped block 124 is formed by a plate 130 projecting substantially as far forward as the upper jaw. The slide block 124 is adapted to be moved by a rod transmission 132 actuated through a rocker 134 by a cam 136 so as to enter and to leave the bore 28 alternately.

Immediately over block 124 is flat block 131 slidably reciprocable horizontally into and out of the bore 28. In its extreme inner position this block constitutes a support for the clothespin jaws located in the recesses 46 as indicated in Fig. 7 with dotted lines. The block 131 is caused to move by a rod 133 actuated through a rocker 135 by a cam 137.

Opposite to block 124 is a further block 138 reciprocable in a vertical direction by the action of a rock lever 140 controlled as to its vertical movement by two cams 142. Block 138 carries a gauge stop 141 adapted to limit the upward movement of the block to the desired level and also a horizontally reciprocable pin 144 guided within a bore of said block. The direction of movement of said pin coincides with that of the block 124 and it is actuated by a cam 150 through a rocker 148 and rod 146. As is clear from Figs. 6 and 7, pin 144 is in the form of a rod of square cross-section. On its upper surface and somewhat spaced from its end adjacent the bore 28 the pin is formed with a recess 149 providing at said end an upwardly projecting shoulder 151 having a shape substantially corresponding to that of the free space within the fork 127 so as to be able in one operative step to enter said space. The shoulder 151 tapers slightly towards the recess 149 and at its end adjacent said recess is provided with an indentation 152.

Additional bar shaped members 154 are guided within the pillar 10 and are horizontally displaceable into and out of the bore 28 by a synchronized movement produced by a cam 160 through rods 156 and rockers 158 of which only one is shown in Fig. 1. The members 154 have bevelled portions 162 at their ends adjacent bore 28, these portions upon movement of the members into the bore contacting one another in front of the fork 127 of the block 124, the fork at that time maintaining its most advanced position within the bore.

Fig. 1 shows also a vertical shaft 164 constituting the attachment for a device forming part of the machine and intended for feeding the clothes-pin jaws into the bore 28, the device being actuated by cams 166, 168. In Fig. 7 is shown at 170 part of a device for collecting the assembled clothes pins.

As will further be clear from Fig. 1, the central pillar 10 is composed of a plurality of removable segments. This feature together with the feature that all transmission rods are detachable from their actuating members when the same are in a certain, predetermined position facilitates the replacement of any worn part and the inspection of the whole machine.

Each complete revolution of the shafts 12, 14 with the cams rigidly connected thereto produces a complete operative actuation of the machine for assembling one clothes pin. Each revolution provides eight different stages during which the various members of the machine perform different movements. The rod 30 descends into the bore 28 in three steps and returns to its uppermost position in two steps.

From the above it will be apparent that the cams, rock levers and rods provide operating means for causing the operation of the various elements of the machine in timed relation. The rod 30 serves to move and assemble the piece of spring strip 48, the clothes pin jaws 139, and moves the clothes pin jaws into the loop formed of wire 96. The block 124, pin 144, and members 154 are reciprocable members serving to form or bend the wire 96 into the loop and positioning the loop so the opening of the loop is generally in alignment with the passage 28.

Assuming that the rod 30 is just starting its third descending step, the fourth phase of assembly is carried out as follows:

*First stage.*—The spring strip 48 is inserted by the spring unit 54 through the aperture 68 in the punch member 70 so as to be located over the die 74. The wire 96 is fed by the spring unit 108 past the gripping member 110 operating as a pair of pliers but at this moment still open, and through the channel 98 in the block 100 along one side wall of the bore 28 and beyond the bore until its protruding end is engaged by the V-shaped recess 104 and reaches the base thereof. At the same time the rod 30 completes its third and last descending step. Due to the fact that the wire extends along one side wall of the bore 28, the movement of rod 30 will not be disturbed.

*Second stage.*—The wire 96 is cut off adjacent to the slide block 100 by the punch or cutter member 101, the block 124 with the fork 127 and the flat plate 130 are advanced into the operative position within the bore, while the rod 30 performs its first return movement. Simultaneously the pin 144 moves forward into the bore in two steps, the first being completed during the two stages above described and prior to the cutting off of the wire. Subsequently its shoulder 151 has abutted against the wire and conveyed it into the small recesses 128 in the free ends of the tines of the fork 127. The wire is thus held in a fixed position without being forced into the interior of the fork.

*Third stage.*—The spring 48 is cut off adjacent to the die 74 by the punch or shear member 70, the gripping member 110 is closed and grips the wire 96, the pin 144 performs its second advancing movement so as to insert the shoulder 151 into the fork 127 and to force the piece 97 cut off from the wire 96 into the indentation 126. The end portions 129 of the wire project somewhat outside the fork on each side of and lie adjacent the shoulder 151. The flat slide block 131 enters the bore 28 and the rod 30 performs its second and last return movement to its starting position ready for its descending movement, as shown in Fig. 1.

*Fourth stage.*—The punch or shear member 70 withdraws from the bore (this movement may if desired be performed later), the piece cut off from the strip 48 is conveyed by the feed member 80 to a position across and beyond the bore 28 in which position it is held by the notches 82 in the two bar-shaped gripping members 84, the jaws 139 of the clothes pin (Fig. 7) are fed into the recesses 46 by a device (not shown) and abut with their lowermost ends against the slide block 131, the wire advancing member slide block 106 is withdrawn from the bore and the wire bending members or bars 154 move synchronously towards the fork 127, during which their projecting ends 162 abuts against the projecting wire ends 129 and bend the same around the shoulder 151 of the pin 144. As the shoulder tapers towards the recess 149 and further is provided with the indentation 152, the wire loop member contacted by the bending members will be compressed to taper in a direction away from the fork, the wire ends 129 forming acute angles with the side portions engaging the indentations in the fork limbs. This compression passing beyond the final predetermined shape of the hoop member is intended to counteract the resilient forces at the corners of bending which become effective on release of the pressure from the members 154.

*Fifth stage.*—The feed member 80 and the wire bending members 154 are retracted, the rod 30 performs its first descending movement and immediately on its tapering portion 32 abutting against the spring member held between the gripping members 84, these latter move into the interior of the bore 28. In co-operation with the bar 30 they ensure that the spring member, when entering the bore, is given a uniform bend so that it may, in the final phase of the first descending movement of the rod, with the assistance of the resilient tongues 47, engage the recesses 171 on the inside of the pin jaws 139 with perfect accuracy. During this stage the block 138 with the pin 144 movable therein moves downwardly carrying the shoulder 151 out of the fork 127, whereas the bent wire loop member is still retained by and lies within said fork.

*Sixth stage.*—The gripping members 84 return to their starting position, the block 131 leaves the bore and the pin 144 returns also into its outward starting position.

*Seventh stage.*—The block 138 carrying the pin 144 moves upwardly into its starting position and the rod 30 performs its second descending movement, entraining the pin jaws 139 by its pressure on the spring member engaging the recesses 171 in said jaws which are thus carried downwardly into the wire loop member still retained by and within the fork 127, until the lower ends of the jaws abut against the member 130 projecting from the block 124, in which position recesses 143 on the exterior sides of the jaws 139 exactly fit the loop member. During the introduction of the jaws into the loop member a further movement has taken place. Immediately after the end portions of the jaws have passed the loop member, the block 124 has moved outwardly a small distance (about 2 mm.). This results in the loop member being slightly displaceable in the indentation 126 during the further passage of the jaws through said member, so that any danger of the jaws becoming stuck fast within the loop member is eliminated. To ensure the guiding of the jaws down into the loop member one side wall of the bore 28 has a projecting portion 67 (Fig. 7) the lower edge of which adjacent the bore is slightly spaced from the ends 129 of the loop member in their bent position.

*Eighth stage.*—The block 124 returns to its starting position.

While one more or less specific embodiment of my invention has been shown, it is to be understood that the same is for purpose of illustration only, and that the invention is not to be limited thereby, but its scope is to be determined by the appended claims viewed in the light of the prior art.

What I claim is:

1. A machine for making clothes pins comprising a frame having a passage, said frame having guide recesses for guiding clothes pin jaws to the passage, a feed member positioned on the frame to feed a strip of spring material into the passage, a slide block mounted on the frame for feeding a wire into the passage, a wire loop forming means mounted on the frame to form a loop from the wire and position it within the passage, clothes pin assembling means to move said jaws, spring and loop in said passage into cooperative relation whereby the spring is moved between the jaws intermediate the ends of the jaws and the loop is positioned between the spring and one end of the jaws and surrounding the jaws, for retaining the clothes pin assembled, and operating means for actuating said feed member, wire loop forming means and assembling means in timed relation.

2. A machine for making clothes pins comprising a frame provided with an elongated passage therethrough, a spring piece feeding member arranged transversely of said passage mounted on said frame for feeding a spring strip across said passage, loop positioning means mounted on said frame, arranged to position a loop transversely of said passage with the opening of said loop in alignment with said passage, guides positioned intermediate said spring piece feeding member and said loop positioning means mounted on said frame for guiding clothes pin jaws into said passage in face to face relation and assembling means movably mounted on said frame to move said spring strip between said jaws and thereafter move said spring and jaws into said loop whereby said loop retains said jaws and spring in assembled relation.

3. A machine for making clothes pins comprising a frame having an elongated passage, guide means formed in said frame for positioning a pair of jaws in opposed relation in said passage, a feed member positioned on said frame and movably mounted thereon for moving a spring into said passage, loop forming means, loop positioning means movably mounted on the frame for positioning a loop formed by said loop forming means in the passage and means for relatively moving and assembling said spring, said jaws and said loop whereby said loop surrounds said jaws intermediate the ends thereof and said spring is positioned to be operative between said loop and one end of said jaws.

4. A machine as defined in claim 3 in which operating means are connected to said feed member, loop forming means, loop positioning means, and the means relatively moving and assembling the spring, jaws and loop for first applying the spring to the jaws and thereafter moving the spring and jaws into the loop.

5. A machine for making clothes pins comprising a frame having an elongated vertical passage extending therethrough, a rod positioned on the frame and mounted for vertical reciprocatory movement whereby the lower end moves in the passage, a feed member mounted on the frame for movement toward and from the passage for feeding a piece of spring strip across the passage adjacent the top thereof, said frame being formed with transverse opposed recesses opening into the passage below said feed member for guiding upstanding clothes pin jaws into the passage, loop forming means, loop positioning means mounted on said frame below said recesses for positioning a loop formed by said loop forming means within said passage with the loop opening extending in the direction of said elongated passage and means to move said rod downwardly whereby the lower end thereof first engages said piece of spring strip then moves the spring strip between the jaws and thereafter moves the piece of spring strip and jaws into the loop.

6. A machine for making clothes pins comprising a frame having an elongated passage extending therethrough, a rod positioned on the frame and mounted for reciprocating movement whereby the lower end moves in the passage, a casing projecting outwardly from said frame and passage mounted on said frame, a slide block mounted in said casing for movement toward and from said passage, said slide block having a groove formed therein for slidably receiving a strip, a detent mounted on said slide block for engaging a spring strip and moving the spring strip toward said passage upon movement of said slide block toward said passage, a shear mounted on the frame and movable across the strip for severing a piece thereof, a feed member mounted on the frame for movement across the path of the strip for feeding the piece of spring strip into the passage adjacent the top thereof, said frame being formed with transverse opposed recesses opening into the passage below said feed member and casing for guiding upstanding clothes pin jaws into the passage, loop positioning means mounted on said frame below said recesses for positioning a loop within said passage with the loop extending in the direction of said elongated passage and means to move said rod downwardly and operating mechanism operable in timed relation for causing the operation of said slide block, shear, feed member, loop positioning means and said rod for forming a clothes pin.

7. A machine for making clothes pins comprising a frame having an elongated vertical passage therein, a vertically disposed rod mounted on the frame for vertical movement with the lower end of said rod extending into said passage, a feed member mounted on the frame for movement toward and away from the passage for feeding a piece of spring strip across the passage, opposed gripping members mounted on the frame for movement toward the passage and adapted to receive and grip the piece of spring fed by said feed member, a device positioned below said feeding member for forming a loop from an elongated wire and positioning said loop in said passage below said feeding member, said frame being provided with upstanding recesses between said feeding member and said device for guiding upstanding clothes pin jaws into said passage, and operating means for moving said rod downwardly whereby the lower end thereof first engages said piece of spring moving the same downwardly between said recesses between clothespin jaws and thereafter moving said piece of spring and clothes pin jaws to a point wherein said loop surrounds said jaws and finally moving the complete clothes pins out of said passage, said operating means also causing the timed movement of the feed member, gripping members, and device whereby a complete clothes pin is formed.

8. A machine for making clothes pins comprising a frame having an elongated passage therein, a feed member movably mounted on said frame adjacent one end thereof for movement toward and away from said passage to feed a spring into the passage, a slide block mounted for movement on the frame to and from the passage for feeding wire into the passage, a cutter mounted on said frame for severing a length of wire, a plurality of reciprocable members mounted on said frame for movement into and out of said passage for engaging said length of wire and forming a loop therein, said frame being provided with opposed recesses extending transversely of and communicating with said passage for receiving and guiding clothes pin jaws into said passage, the arrangement from said one end of the passage to the other being the feed member, opposed recesses the slide block and reciprocable members, and means to move the spring, clothes pin jaws and loop from said one end of the passage to the other end and operating means actuated in timed relation to actuate said feed member, slide block, reciprocable members and said moving means in proper sequence to form a clothes pin.

9. A machine for forming clothes pins having a pair of opposed jaws, a spring urging the jaws apart and a loop surrounding said jaws intermediate the spring and one end of the jaws comprising a frame having an elongated passage, a feed member adjacent one end of said passage mounted on said frame for movement to and from said passage for feeding a spring into said passage, guide means in said frame between said feed member and the other end of said passage for guiding clothes pin jaws in opposed relation into said passage, a slide block positioned between said guide means and the other end of said passages mounted for movement toward and away from the passage for feeding wire thereto, a cutter positioned adjacent said slide block for cutting a length of wire therefrom and a plurality of reciprocable members mounted on said frame adjacent said slide block and cutter for movement into and out of said passage for engaging and bending said length of wire into a loop and positioning the loop in the passage, means to assemble said spring, jaws and loop to form a clothes pin, and operating means for actuating said feeding member, slide block, cutter, and reciprocable members and assembling means in timed relation.

10. A clothes pin making machine comprising a frame having a vertically disposed elongated passage formed therein, a feed member adjacent the top of the passage mounted on said frame for movement toward and away from the passage for feeding a spring into the passage, opposed recesses in the frame communicating with said passage for guiding clothes pin jaws into the passage, a first slide block having a forked end reciprocably mounted to provide movement of its forked end into the passage, a pin arranged in opposed relation to said first slide block mounted on said frame to provide movement of one end thereof into and out of said passage and the space between the tines of the fork, said pin at one end thereof being formed with a shoulder, a second slide block mounted on said frame for movement toward and away from said passage for guiding a length of wire across the forked end of said first slide block, said shoulder of said pin being operative to thereafter bear against the length of wire and bend it between the tines of said fork for forming a U-shaped wire, a pair of wire bending members arranged in opposed relation adjacent to and transversely disposed to said pin for engaging the free ends of said U-shaped wire and mounted for movement into said passage to form a loop of said U-shaped wire, means to assemble said spring, jaws and loop, and operating means for actuating said feed member, first slide block, pin, second slide block, wire bending members and assembling means in timed relation.

11. A machine for making clothes pins comprising a frame having a vertical passage extending therethrough, said frame being provided with clothes pin jaw guides for positioning the jaws in opposed spaced upstanding relation within said passage, means positioned above said guides for positioning a flat spring across said passage, means located below said guides for positioning a loop in substantial registry with said passage, movable support located between said loop positioning means and said guides for extension into said passage for supporting said clothes pin jaws above said loop positioning means and withdrawable from the vertical passage to allow clothes pin jaws to pass therethrough, and means for engaging the flat spring and forcing the same between two clothes pin jaws and bending the same into U-shape while the jaws are supported on said movable support and thereafter moving the jaws and spring so that the jaws are surrounded by said loop and discharging the assembled clothes pin from the passage, and timing means for operating each of said means in the aforementioned sequence.

References Cited in the file of this patent

UNITED STATES PATENTS

| Number | Name | Date |
|---|---|---|
| 1,105,590 | Abbott | July 28, 1914 |
| 1,426,760 | Nickol | Aug. 22, 1922 |
| 1,486,664 | Hires | Mar. 11, 1924 |
| 1,616,641 | Tainter | Feb. 8, 1927 |
| 2,190,611 | Sembdner | Feb. 13, 1940 |
| 2,294,253 | Taberlet | Aug. 25, 1942 |
| 2,475,112 | Stanitz | July 5, 1949 |